Patented Sept. 25, 1923.

1,469,191

UNITED STATES PATENT OFFICE.

WILLIAM SHEFF AND HENRY WM. SHEFF, OF BROOKLYN, NEW YORK.

GOLD SOLDER.

No Drawing.      Application filed November 22, 1921.   Serial No. 517,084.

*To all whom it may concern:*

Be it known that we, WILLIAM SHEFF and HENRY W. SHEFF, both citizens of the United States, and residents of the city of New York, borough of Brooklyn, in the county of Kings and State of New York, have invented a new and Improved Gold Solder, of which the following is a full, clear, and exact description.

This invention relates to a solder for gold, and has particular reference to a solder used in connection with the manufacture of jewelry made of so called "white gold."

An object of the invention is to provide a simple, effective and easily manipulated solder for gold.

A further object resides in the provision of a solder that has the proper color to conform to the color of the jewelry or material with which it is being used and yet which can be easily manipulated in the process of application.

A still further object resides in the provision of a solder, which, when used, will have a very long life and at all times retain its original color.

A further object resides in the provision of the particular combination of ingredients and the proportions thereof hereinafter described and claimed.

Our invention comprises a solder for gold which is composed of the following ingredients, namely, gold, nickel, zinc and copper. This solder is adapted to be used in the soldering of jewelry made of so called "high carat gold" and is adapted not only to be efficient as a solder, but to retain its particular color indefinitely, which is a very important feature by reason of the contrast between it and the color of the gold with which it is used if it did not retain its color.

Preferably we form this solder by melting the above-mentioned ingredients in a crucible under the proper temperature until they are all melted and form an alloy. The proportions of the ingredients are approximately as follows, although certain variations in the proportions are possible without departing from the spirit and essence of the invention: gold—62% to 65%, nickel—7% to 10%, zinc—14% to 17%, and copper—13% to 14½%.

For example, a particular alloy which may be formed in accordance with our invention includes the use of gold approximately 60%, nickel approximately 7%, zinc approximately 16%, and copper approximately 15%.

The particular method used in the formation of this alloy and described above is only one way in which it can be produced, any well-known metallurgical method suitable for the production of alloys being within the province of the skillful metallurgists.

What we claim is:

1. A composition of matter for use as a solder for gold, which comprises gold approximately 60%, nickel approximately 7%, zinc approximately 16%, and copper approximately 15%.

2. A composition of matter for use as a solder for gold, which comprises gold 62% to 65%, nickel 7% to 10%, zinc 14% to 17%, and copper 13% to 14½%.

3. A composition of matter for use as a solder for gold, which comprises gold approximately 60% to 65%, nickel approximately 7% to 10%, zinc approximately 14% to 17%, and copper approximately 13% to 15%.

WILLIAM SHEFF.
HENRY WM. SHEFF.